United States Patent
Winkelbach et al.

(10) Patent No.: US 6,875,916 B2
(45) Date of Patent: Apr. 5, 2005

(54) ARRANGEMENT FOR LAYING CABLES IN THE FLOOR AREA OF A PASSENGER TRANSPORT AIRCRAFT

(75) Inventors: Horst Winkelbach, Buchholz (DE); Ruediger Von Hacht, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1 day.

(21) Appl. No.: 10/688,014

(22) Filed: Oct. 15, 2003

(65) Prior Publication Data

US 2004/0129445 A1 Jul. 8, 2004

(30) Foreign Application Priority Data

Oct. 16, 2002 (DE) ......................................... 102 48 241

(51) Int. Cl.[7] ................................................. H02G 3/04
(52) U.S. Cl. ............................. 174/48; 174/49; 174/95; 174/68.3; 52/220.1; 52/220.3; 248/68.1
(58) Field of Search ........................... 174/48, 49, 68.3, 174/60, 68.1, 72 A, 95, 97, 135, 72 R, 96, 99 R, 70 C, 65 R; 52/220.1, 220.3, 220.5, 220.7; 385/134, 135; 248/68.1; 220/3.2, 3.8, 3.3, 4.02, 4.01

(56) References Cited

U.S. PATENT DOCUMENTS

| | | | | |
|---|---|---|---|---|
| 4,723,580 A | * | 2/1988 | Trautwein | ................... 174/68.3 |
| 5,336,849 A | * | 8/1994 | Whitney | ..................... 52/220.5 |
| 5,907,936 A | * | 6/1999 | Littrell | .......................... 174/49 |
| 6,367,211 B1 | * | 4/2002 | Weener et al. | ................. 174/48 |
| 6,437,247 B1 | * | 8/2002 | Holliday | ....................... 174/48 |
| 6,498,297 B2 | * | 12/2002 | Samhammer | .............. 174/72 A |
| 6,504,093 B1 | * | 1/2003 | Cawley | ......................... 174/48 |
| 6,566,598 B1 | * | 5/2003 | Strong | .......................... 174/48 |
| 6,674,000 B2 | * | 1/2004 | Lambiaso | ................... 248/68.1 |
| 6,743,976 B2 | * | 6/2004 | Motzigkeit | ................. 174/68.1 |

* cited by examiner

Primary Examiner—Dean A. Reichard
Assistant Examiner—Angel R. Estrada
(74) Attorney, Agent, or Firm—W. F. Fasse; W. G. Fasse

(57) ABSTRACT

A conduit system for laying cables along the floor of a passenger cabin of an aircraft includes longitudinal and transverse cable guide elements respectively forming cable channels, and cable branch junctions at intersections of the longitudinal and transverse guide elements. Each guide element includes a lower part secured to the cabin floor, and an upper part secured (e.g. snap fitted) onto the lower part to cover the cable channel. The cable branch junction includes a lower section secured to the floor and covered by an upper section, and allows the cables to continue straight through the junction or to be deflected by 90° or by 180°. With this arrangement, a greater number and greater diameter of cables can be laid out with a minimal installation effort. The components of the system are easily adaptable to any required installation layout, while providing a continuous covered protected enclosure for the cables.

19 Claims, 12 Drawing Sheets

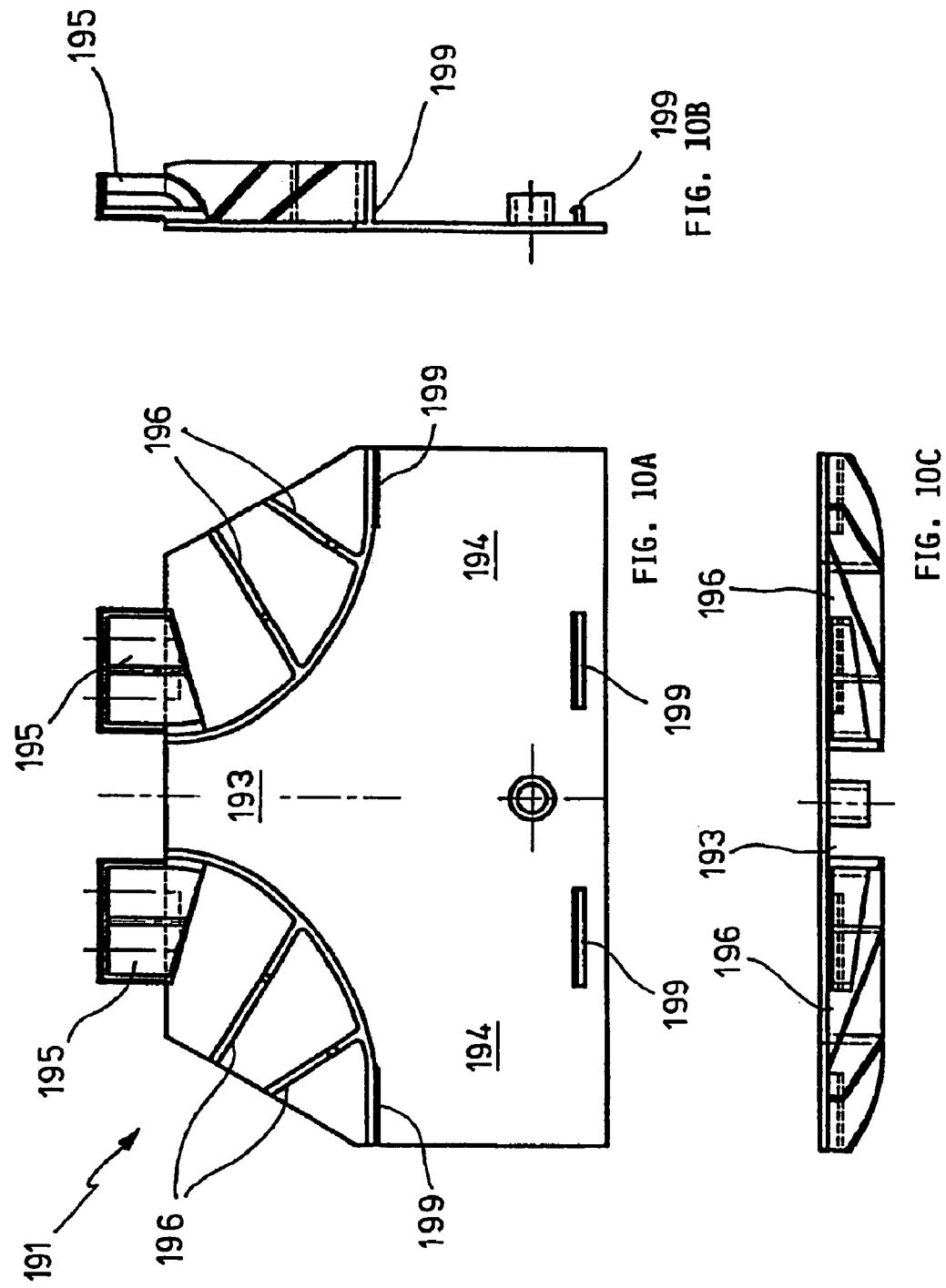

ARRANGEMENT FOR LAYING CABLES IN THE FLOOR AREA OF A PASSENGER TRANSPORT AIRCRAFT

PRIORITY CLAIM

This application is based on and claims the priority under 35 U.S.C. §119 of German Patent Application 102 48 241.1, filed on Oct. 16, 2002, the entire disclosure of which is incorporated herein by reference.

FIELD OF THE INVENTION

The invention relates to an arrangement for laying cables or lines, such as electrical or fiber optic cables, in the area of the floor of a passenger transport aircraft, including longitudinal or lengthwise guide elements and transverse or crosswise guide elements that together form the cable channels, also known as conduits or raceways.

BACKGROUND INFORMATION

It is generally known to provide conductor lines and cables or cable bundles, e.g. electrical cables and/or fiber optic cables, in the floor area of the passenger cabin of passenger transport aircraft, to supply power and data to various electrical connections or receptacles provided in the passenger seats, as well as to entertainment and information systems integrated into the passenger seats. Thus, various data and power supply lines must be laid out throughout the cabin, as a particular example, for the passenger entertainment system (PES) or for power supply lines for the electric power outlets for connecting laptop computers or other portable personal electronic devices. The lines or cables in this regard are generally laid in cable channels that run along the passenger cabin floor and are either visibly exposed or merely covered by the floor carpeting. In addition to the longitudinal or lengthwise cable runs in the area of the seat mounting rails, it is also necessary to provide a transverse or crosswise cable run for the cabling of each individual seat group. In this context, each crosswise cable run extends from a connection module in the area of the dado panel, that is to say from the wall paneling or trim directly adjacent to the floor within the aircraft cabin. With such a cable layout, the occurrence of crossing cables also arises.

The typical conventional manner and system of laying out the various cables and lines as described above, using typical conventional cable channels, is relatively complicated, time consuming and costly, allows freely exposed and thus unprotected cable lines, and cannot be flexibly adapted to meet the requirements of an improved seat cabling layout. Due to the ever-increasing improvements of the information and entertainment options being made available to passengers in each individual passenger seat, there is an ever-increasing number and complexity of data and power supply lines that must be laid out in the passenger cabin of the aircraft and particularly to each individual passenger seat. This demands improvements in the system of cable channels, conduits, or raceways and the like used for laying out the cables and lines.

SUMMARY OF THE INVENTION

In view of the above, it is an object of the invention to provide an arrangement for laying out cables and the like in an aircraft cabin, which makes it possible to lay out larger diameter cables as well as an increased number of cables and lines, with a minimal installation effort and complexity, in comparison to conventional cabling arrangements. A further object of the invention is to enable the flexible and easily adaptable arrangement of the cable laying paths, while continuously and completely enclosing or covering and thus protecting the cables. The invention further aims to avoid or overcome the disadvantages of the prior art, and to achieve additional advantages, as apparent from the present specification.

The above objects have been achieved according to the invention in a passenger transport aircraft with a passenger cabin bounded from below by a cabin floor, with longitudinal or lengthwise guide elements and transverse or crosswise guide elements forming cable channels to receive cables and lines laid out therein along the cabin floor. Throughout this specification, the terms lengthwise and longitudinal refer to the direction generally extending along the longitudinal (roll) axis of the aircraft, while the terms transverse and crosswise refer to the direction extending generally along the transverse or crosswise (pitch) axis of the aircraft. The terms cable and line both interchangeably refer to any conductor or group of conductors such as an electrical conductor or a fiber optic light conductor, which is preferably insulated and sheathed in any conventionally known manner.

According to the invention, the longitudinal guide elements and the transverse guide elements each respectively comprise a lower part and an upper part, whereby each lower part is secured to the aircraft cabin floor and the respective upper part is arranged and preferably secured on the associated lower part, for example being snapped or otherwise fastened onto the associated lower part. Furthermore, a cable branch junction is connected to the guide elements to form at least one intersection or crossing point of the longitudinal and transverse guide elements. The longitudinal and transverse guide elements and the cable branch junction together form a cable laying path to receive the cables or conductor lines therein.

In the inventive arrangement, it is especially advantageous that the various components are so configured that they can be individually combined with one another in a flexible, adaptable, and variable manner, so as to form selectable or variable cable laying paths for conductor lines, cables and cable bundles with a layout, configuration and arrangement meeting the requirements of any particular installation application. It is thus possible to quickly and precisely lay out the various cables and conductor lines to the power and data supply units at the passenger seats of a passenger transport aircraft. A continuous and complete protection of the cables and conductor lines is ensured, namely a fixedly secured and covered or closed and thus protected cable laying path is provided in the connection area of the seat frame to the seat rails, in the areas between seats, and also in the areas from seat row to seat row, within an aircraft passenger cabin. Moreover, this installation can be carried out with a minimal effort, complexity, and expense.

BRIEF DESCRIPTION OF THE DRAWINGS

In order that the invention may be clearly understood, it will now be described in connection with example embodiments, with reference to the accompanying drawings, wherein:

FIGS. 10A, 10B and 10C are top, side and end views of a lower section of a cable branch junction of the inventive arrangement;

DETAILED DESCRIPTION OF PREFERRED EXAMPLE EMBODIMENTS AND OF THE BEST MODE OF THE INVENTION

Figure 1:
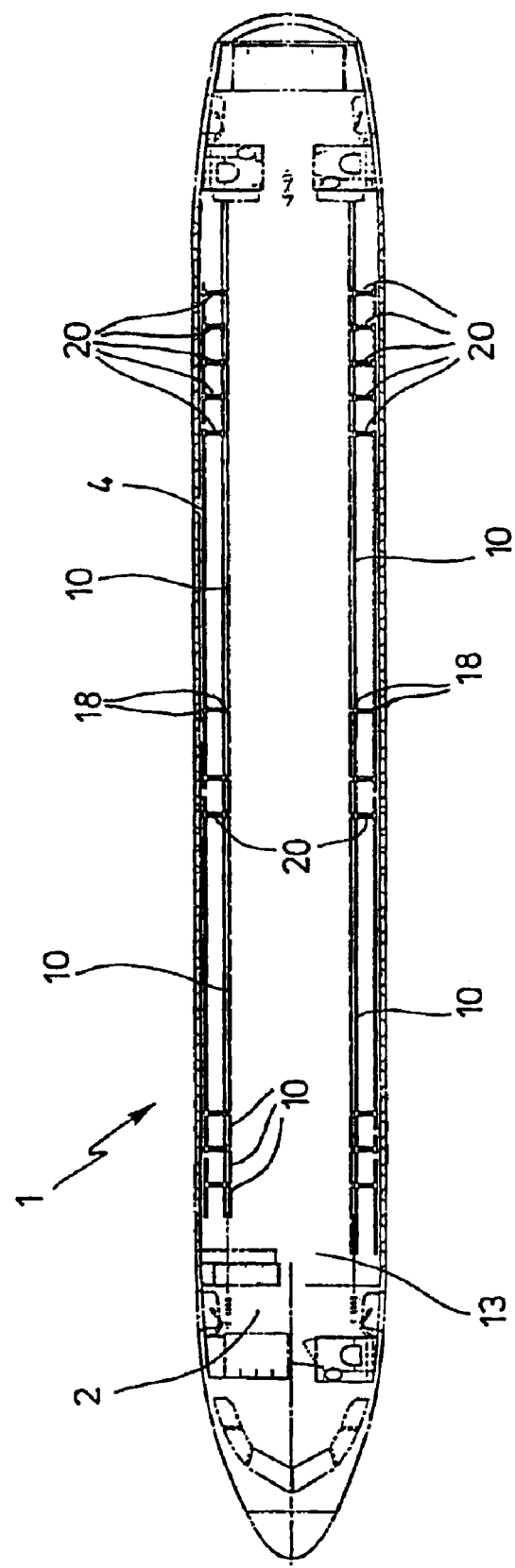
FIG. 1 is a schematic top plan view of a passenger cabin of a passenger transport aircraft with an installed arrangement for laying out cables according to the invention.

FIG. 1 schematically shows a top plan view of an aircraft passenger cabin 2 of a passenger transport aircraft. In the area of the aircraft floor 13, it is necessary to arrange conductor lines and cables for supplying data and/or electrical power to the passenger seats. A cable laying arrangement 1 according to the invention comprises a cable or line laying path 4, or generally a conduit or raceway arrangement, for the passenger transport aircraft. In the present example, the passenger aircraft is represented by the Airbus A318 aircraft, of which the cabin layout is schematically shown in this top plan view.

Figure 8:
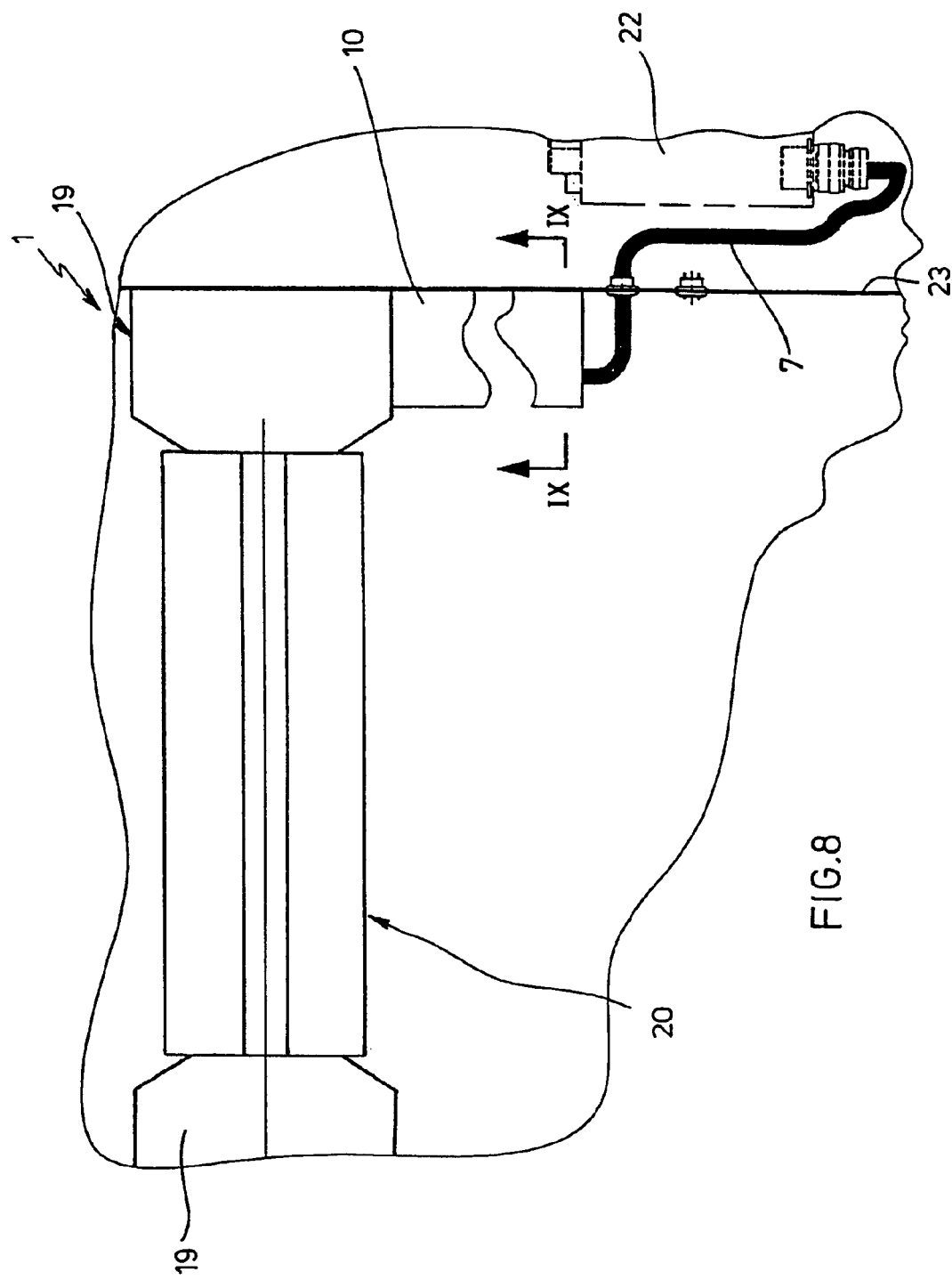
FIG. 8 is a top plan view of the inventive cable laying arrangement in the area of a connection unit with transverse or crosswise extending cable guide elements.

The cable layout is particularly carried out in longitudinal guide elements 10 and transverse guide elements 20 arranged in the area of the passenger seat groups, which are not shown. At respective intersections or crossing points 18 between the longitudinal guide elements 10 and the transverse guide elements 20, respective cable branch junctions 19 are provided (for example as shown in FIG. 8). These identified individual components, namely the longitudinal cable guide elements 10, the transverse cable guide elements 20, and the cable branch junctions 19 are configured so that they may be individually combined and connected with each other in different configurations, so as to form an overall cable laying arrangement, e.g. a conduit or raceway arrangement, for receiving the conductor lines, cables and/or cable bundles, corresponding to the particular requirements of the individual installation application. For example, it is a simple matter to join several standard modular parts or to cut the cable guide elements 10 and 20 to the respective required length, and to combine the various elements in any required number and configuration. Thereby, a precise and rapid laying of cables and conductor lines to the supply units on the passenger seats of essentially any aircraft cabin layout can be realized.

Figure 2:
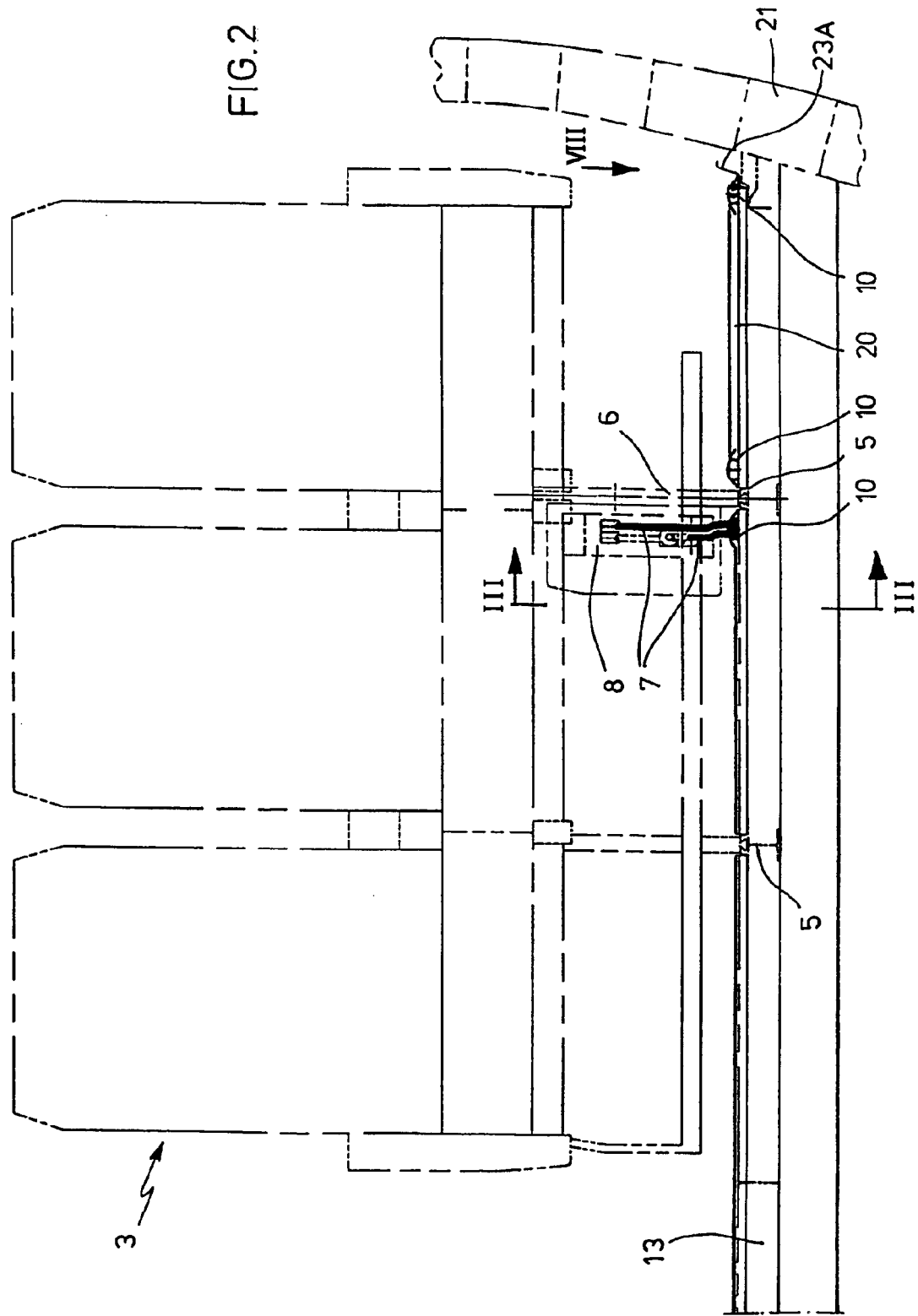
FIG. 2 is a schematic front elevation view of a seat group and its cable layout in a passenger cabin of an aircraft, e.g. the aircraft according to FIG. 1.
Figure 3:
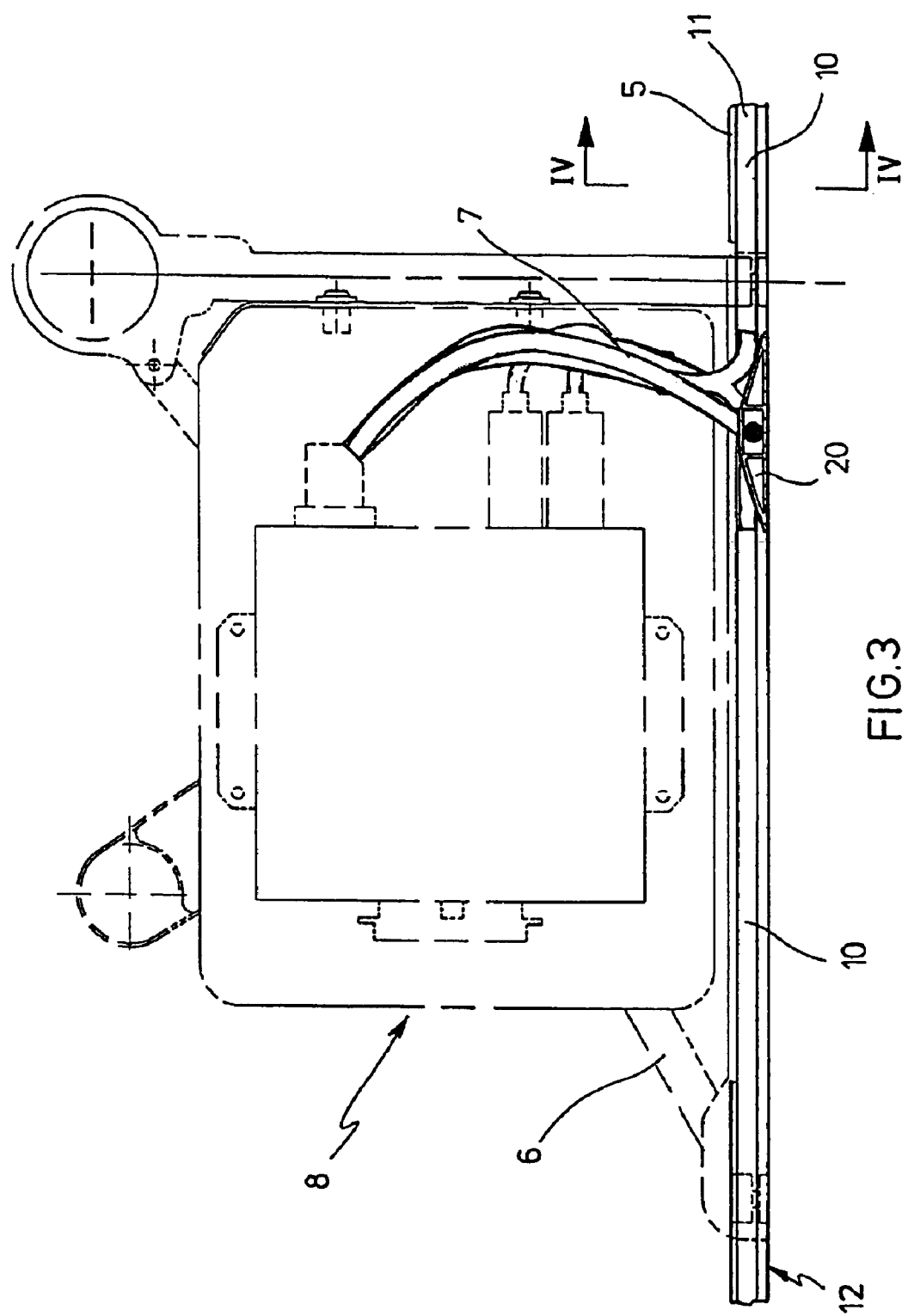
FIG. 3 is an enlarged sectional side view of a portion of FIG. 2, as seen along the section plane III—III, especially showing the supply unit at the seat leg or foot of a seat group.

FIG. 2 shows a front elevation view of an exemplary passenger seat group 3 that is secured and mounted on seat rails 5 extending longitudinally along the aircraft cabin floor 13. In a passenger transport aircraft, a plurality of such three-abreast seat groups, two-abreast seat groups, as well as individual seats, are arranged one after another and thereby form respective seat rows. In order to supply an individual seat row with data and electrical power, a supply box or supply unit 8 is arranged in the area of the seat leg or foot 6 of the seat frame of the respective seat group 3. FIG. 3 shows a side view of the supply unit 8, which is also known as a connection box, as an individual detail.

In order to supply the required data and power to provide the desired information, entertainment and power to the individual passengers in the individual seats, data and power supply lines 7 must be laid out to the supply unit 8. In the illustrated example embodiment, the supply lines or cables 7 extend crosswise or transversely in the cabin, beginning from a connection in the area of the aircraft wall 21, through a transverse guide element 20 into the area of the seat group 3, and there to the supply unit or connection box 8. Alternatively or additionally, the cables or conductor lines 7 are laid out in longitudinal guide elements 10 along the seat rail 5 to extend to a further seat row, i.e. another seat group arranged in front of or behind the illustrated seat group 3. As can be seen, each longitudinal guide element 10 includes one or more lower parts 12 and one or more upper parts 11, whereby the upper parts 11 may have gaps or slots therein to allow the conductor lines 7 to branch off and extend upwardly from the guide element 10 to the supply unit or connection box 8.

Figure 4:
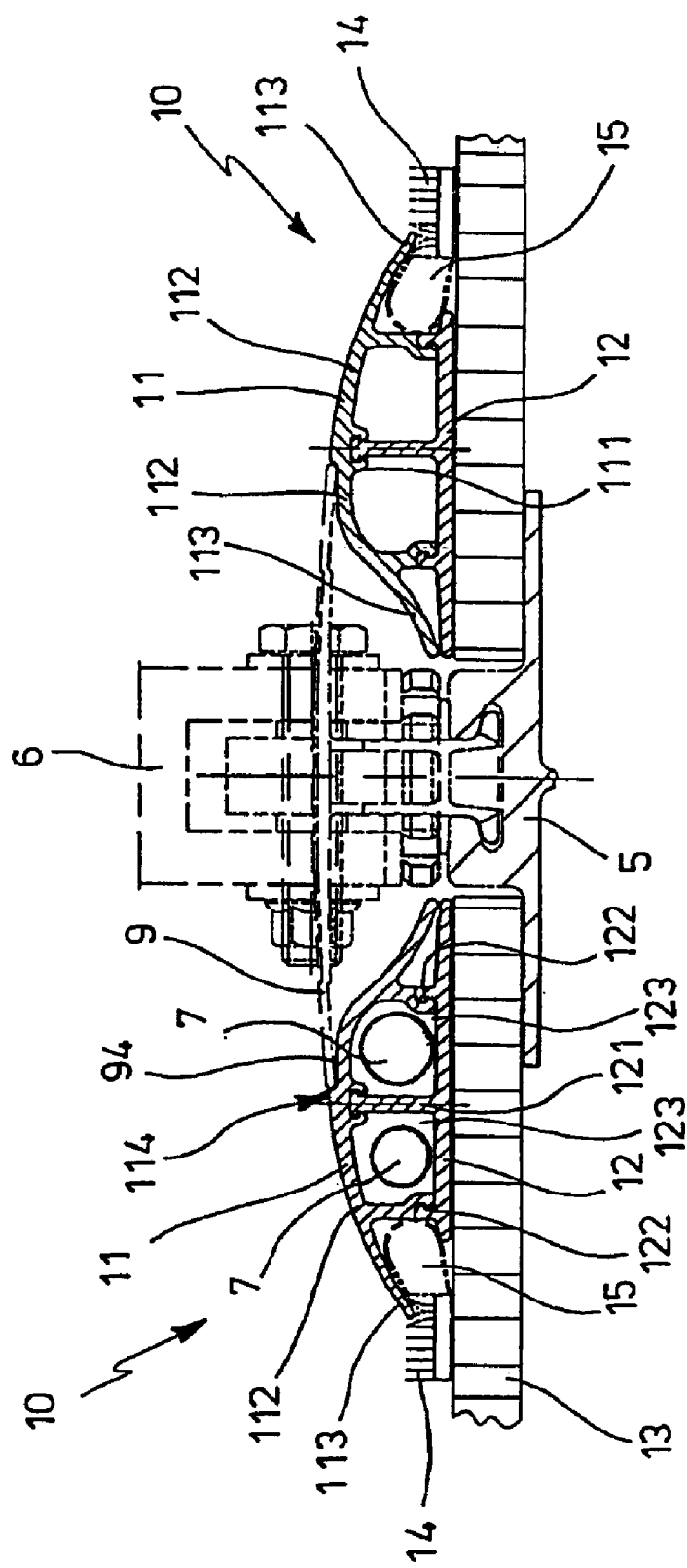
FIG. 4 is an enlarged sectional view along the section line IV—IV in FIG. 3, showing a section of the longitudinal cable guide elements in the area of the seat mounting rail.

The cable layout in the area of a seat rail 5 is shown in a sectional view in FIG. 4. As shown by dashed lines, the seat leg or foot 6 of the seat group frame is secured at the desired location in the seat rail 5. In the areas along the seat rail 5 between successive seat rows, i.e. areas that do not receive a seat leg or foot 6 of the seat frame of a seat group, a seat rail cover 9 is provided to cover and close the open slot of the seat rail 5.

As also seen in FIG. 4, two longitudinal cable guide elements 10 are arranged on the two opposite sides of and parallel to the seat rail 5. Each longitudinal guide element 10 comprises an upper part 11 and a lower part 12, which can each be provided in standardized lengths that can then be joined together in the manner of modules, or even cut to required shorter lengths, in order to form the overall total length of the longitudinal guide element 10 as required. The upper part 11 and the lower part 12 are preferably extruded sectional members, which make an economical fabrication thereof possible. The parts 11 and 12 may be made of a synthetic plastic, and preferably a polyamide.

Basically, one or more lower parts 12 are arranged one after another to form a cable laying path 4 on the aircraft floor 13, and are then secured to the floor 13 (for example by screws, adhesive, brads, rivets, snap fasteners, or the like). Then the cables and/or conductor lines 7 are laid into the channel or cable laying path 4 formed by the lower parts 12. Finally the one or more upper parts 11 are arranged and secured (e.g. snap-fit) onto the lower parts 12 so as to cover the cable laying path 4 with the cables or lines 7 enclosed therein.

The lower part 12 of each longitudinal guide element 10 comprises a base, a central web 121 protruding upwardly from the base, as well as two side webs 122 spaced laterally from and extending parallel to the central web 121. Thereby, a respective cable channel 123 is formed respectively on the left side and the right side of the central web 121. The upper part 11 of each longitudinal guide element 10 comprises a downwardly facing catch or snap-in element 111 that mates or cooperates with a counterpart catch element, such as a protruding bead, on the upper end of the central web 121 of the lower part 12. The upper part 11 further comprises two opposite lateral cover strips 112 extending laterally from the catch or snap-in element 111. The lateral cover strips 112 respectively cover the individual cable channels 123 and can snap-engage with the side webs 122 of the lower part 12. Thereby, the upper part 11 can be easily positioned and snap-engaged onto the lower part.

The edge portion or rim 113 of a respective lateral cover strip 112 protrudes laterally over and beyond the respective cable channel 123, and is embodied in a bendable and elastically flexible manner. Thereby, this flexible edge portion or rim 113 facing outwardly away from the seat rail 5 forms a smooth finished trim transition to a floor covering 14 provided on the cabin floor 13, for example a carpet edge 15. Particularly, the carpet edge 15 is inserted under the flexible edge or rim 113 of the upper part 11 in this context. This achieves a clean, finished trim covering of the carpet edge 15. Also, the edge rim 113 of the lateral cover strip 112 exerts an elastic pressing or clamping force on the carpet edge 15 so as to hold the carpet 14 in position and/or to prevent the carpet edge 15 from coming loose and flipping or folding or rolling up, which would present a tripping hazard for the passengers.

On the other hand, the inwardly directed lateral cover strip 112 facing toward the seat rail 5 transitions smoothly downwardly, so that its elastically flexible edge portion or rim 113 lies on the outer rim of the base of the lower part 12 of the longitudinal guide element 10.

Figure 5:
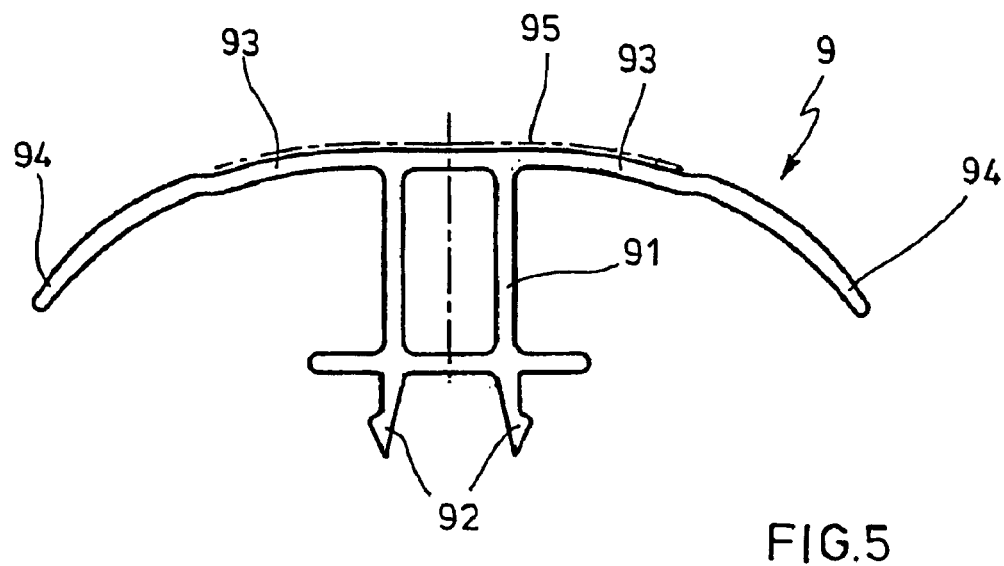
FIG. 5 is an enlarged detail view of a seat rail cover that cooperates with the cable laying arrangement.

As mentioned above, a seat rail cover 9 is arranged on top of and covers the areas of the seat rail 5 that do not receive the seat legs or feet 6 of the seat frame of the passenger seat groups. FIG. 5 shows the arrangement of such a seat rail cover 9 as a detail in section. The seat rail cover 9 can be economically and easily fabricated as an extruded sectional member of a plastic, such as preferably a polyamide. The seat rail cover 9 comprises a central member 91 with catch or snap elements 92, which are configured to reach in and engage the seat rail 5 so as to hold the cover 9 in the proper position. Extending laterally from the top of the central member 91 are respective lateral cover strips 93, of which the respective edge portions or rims 94 are elastically flexible while curving generally downwardly toward the aircraft floor. At least the central area of the top of the seat rail cover 9 is provided with an antislip surface 95 or the like, in order to avoid or reduce the likelihood of slipping by passengers who walk or step on the seat rail cover 9.

As can be seen in FIG. 4, the edge portions or rims 94 of the lateral cover strips 93 of the seat rail cover 9, in the installed condition, may rest with an elastic pressure on the upper parts 11 of the longitudinal guide elements 10 running along both sides of the seat rail 5. For this purpose, the upper contour of the upper part 11 of each longitudinal guide element 10 preferably has a corresponding configuration to cooperate with the edge rim 94 of the seat rail cover 9, for example a small recess step or shoulder groove 114, into which the edge rim 94 of the seat rail cover 9 can be flushly received. Thereby, the seat rail cover 9 at least partially covers the longitudinal guide elements 10 extending parallel to the seat rail 5, whereby the edge rim 94 of the seat rail cover 9 at least partially overlaps the upper part 11 of the guide element 10 on each side. The above mentioned recessed step or shoulder groove 114 in the upper part 11 for receiving the edge rim 94 of the seat rail cover 9 ensures that there is a smooth flush transition between the two components, with no noticeable edge or protrusion, so as to avoid a tripping or catching hazard for the passengers.

Figure 6:
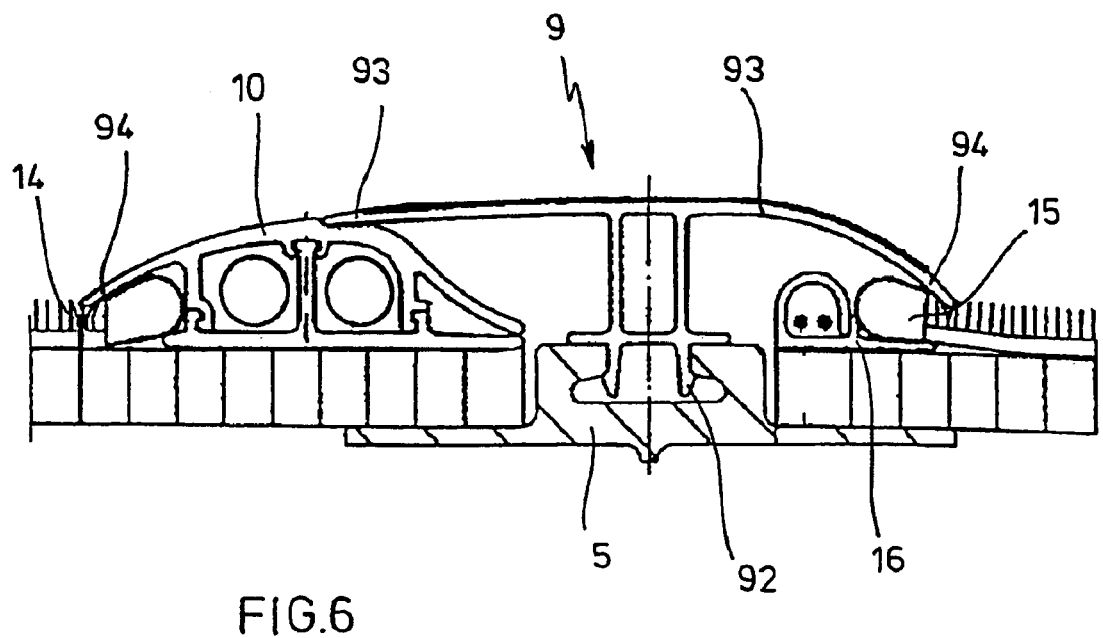
FIG. 6 is an enlarged detail sectional view of a longitudinal cable guide element in the area of a seat rail, according to a second embodiment.

FIG. 6 shows an alternative example embodiment, in which the seat rail cover 9, after being installed with the catch or snap elements 92 engaged in the seat rail 5, covers a single longitudinal guide element 10 with its lateral cover strip 93 in the above described manner on only one side of the seat rail 5. On the other side of the seat rail 5, the other lateral cover strip 93 of the seat rail cover 9 at least partially covers a typical conventional cable guide 16 and/or a floor covering edge 15. Due to the flexibly bendable embodiment of the edge portion or rim 94 of the cover strip 93, the rim 94 extends over the floor covering edge 15 while exerting an elastic holding force so as to secure the carpet 14 in place and prevent the edge thereof from tipping, flapping, or rolling up, which would otherwise present a tripping hazard.

Figure 7A:
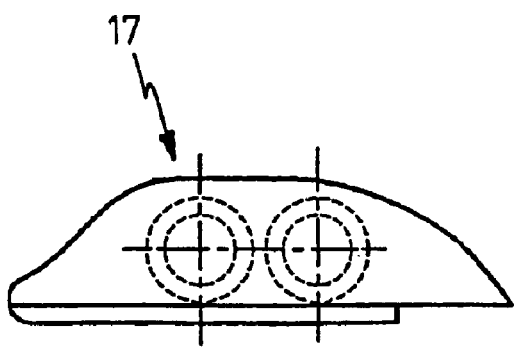
FIGS. 7A, 7B and 7C are an end view, a side view, and a top view of an end cap as a closure element of a cable guide element.
Figure 7B:
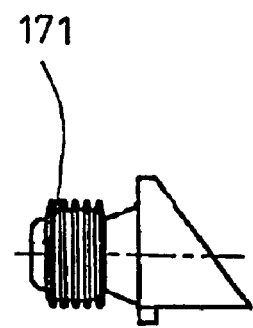
Figure 7C:
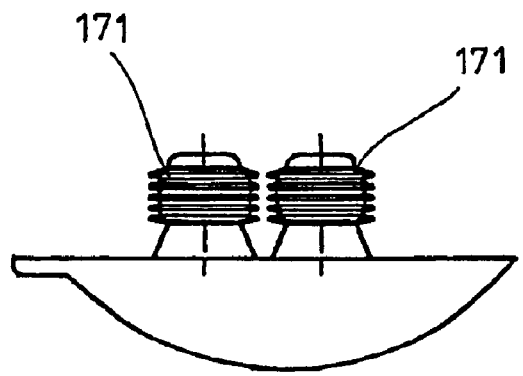

FIG. 7, including FIGS. 7A, 7B and 7C, shows three views of an end cap 17 as an individual detail. Such an end cap 17 can be used to cover and close the end of a respective cable laying path 4, i.e. the end of a respective longitudinal guide element 10. For this purpose, the end cap 17 includes protruding catch or snap studs 171 that can be frictionally or form-fittingly engaged in the open ends of the cable channels 123 formed in the longitudinal guide element 10, so as to secure the end cap 17 and thereby close the end of the cable channel or cable laying path. This protects the cables and conductor lines 7 arranged therein, provides a neat finished appearance, prevents or reduces a tripping and catching hazard for passengers on the end of the guide element 10, and prevents dirt, dust, refuse or other contaminants from penetrating into the cable channels 123.

FIG. 8 shows a top plan view of a portion or area of the cable laying arrangement 1 relating to the crosswise or transverse extending run of the cables or conductor lines 7. A connection module 22 is arranged in the area of, or particularly enclosed behind, the dado panel 23, i.e. the lower portion of the cabin wall trim paneling 23 in the passenger footwell area, i.e. near the floor of the passenger cabin. This connection module 22 makes available electrical power as well as data and other signals for the passenger entertainment system and other power and data needs at the passenger seats, to be supplied via the cable 7 and the supply unit 8 arranged on the corresponding passenger seat group as described above. Such connection modules 22 are provided at approximately, for example, every fifth seat row. It is thus necessary to provide a suitable cable layout extending to the individual passenger seat rows from the connection module 22 closest to a given row.

Figure 14:
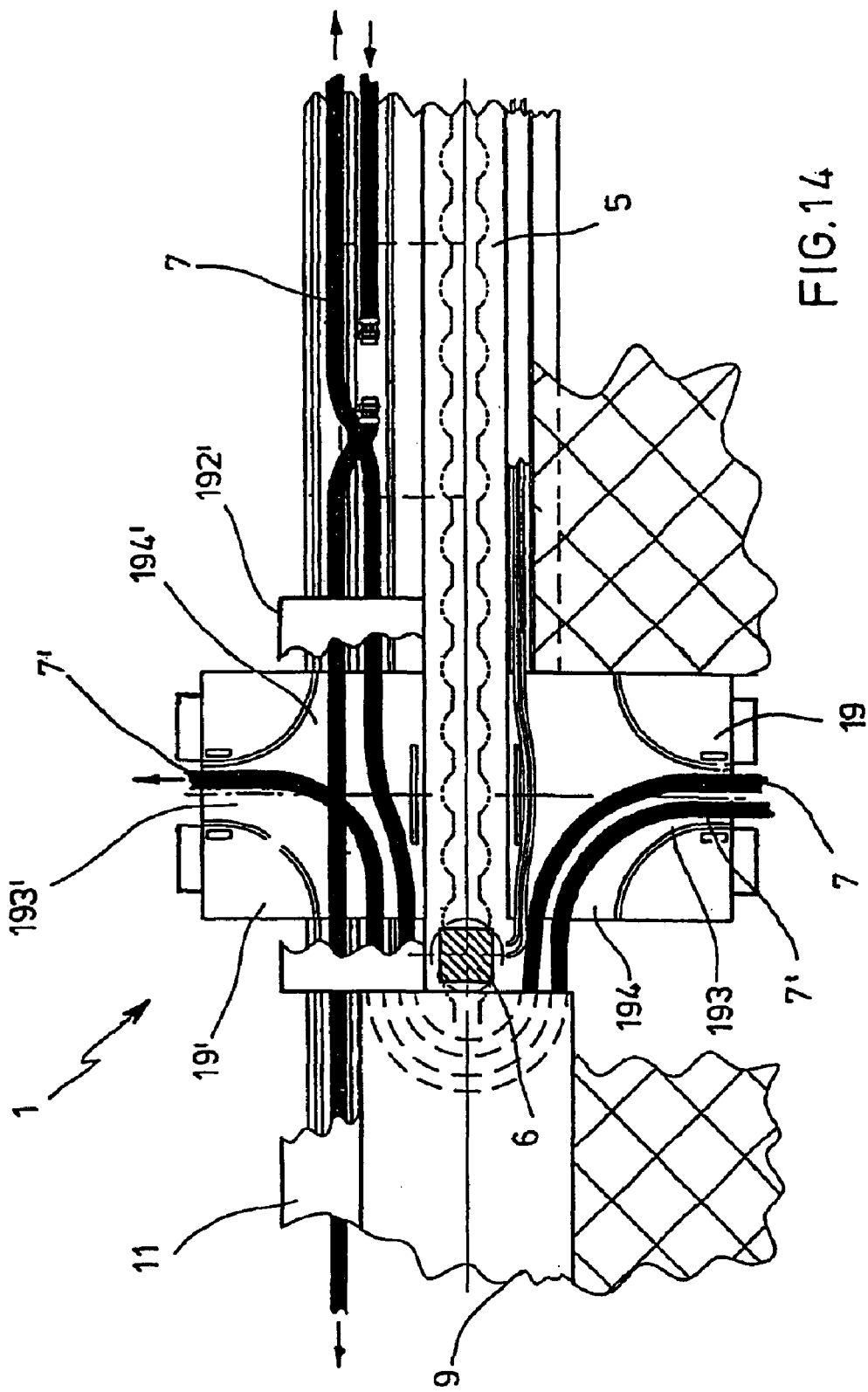
FIG. 14 is a partially broken open top plan view of an example of the cable laying arrangement in the area of a cable branch junction installed at or adjacent to a seat mounting rail.

In this regard, the supply cable or conductor line 7 is guided via at least one longitudinal guide element 10 along the edge of the floor 13 adjoining the dado panel 23 to the location at which a crosswise or transverse run of the cable is to be directed toward the seat rail to supply a given seat row. At this location, a cable branch junction 19 is joined to the longitudinal guide element 10, whereby this cable branch junction 19 allows respective cables 7 to extend continuously in the longitudinal direction through the cable branch junction 19, or to be deflected into a crosswise direction and directed into a transverse guide element 20 that is also connected to the cable branch junction 19. In this regard, both the longitudinal guide element 10 and the transverse guide element 20 can respectively be assembled from standard length modular elements and/or may be cut to length as needed. Then, at the appropriate transverse or crosswise location, of a corresponding intersection or crossing point 18, a further cable branch junction 19 is joined to the transverse guide element 20 to allow the conductor lines or cables 7 to be redirected into yet another longitudinal guide element 10, for example along the seat rail (a particular example embodiment is illustrated in FIG. 14, which will be described below).

Figure 9:
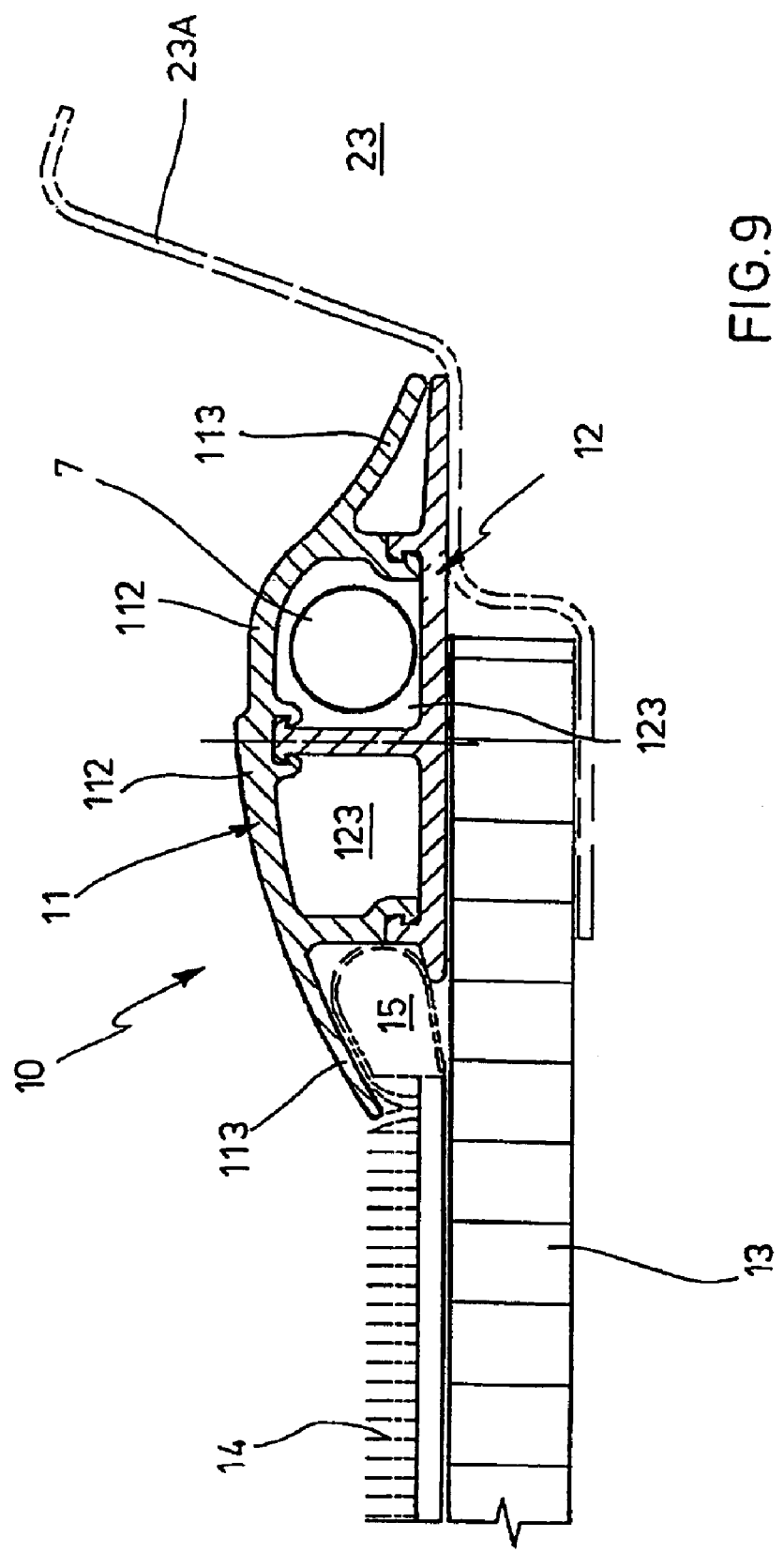
FIG. 9 is a sectional view of a longitudinal cable guide element in the area of the side trim or wall paneling along the edge of the cabin floor of the passenger cabin, as seen on the section line IX—IX in FIG. 8.

FIG. 9 shows the sectional view taken along section line IX—IX in FIG. 8, of the longitudinal guide element 10 running along the area of the side wall trim paneling 23 of the aircraft passenger cabin 2. As can be seen, this longitudinal guide element 10 is identical to the longitudinal guide elements arranged along the seat rail as described above as an example in connection with FIG. 4. Through such use of the same components in various different locations in the overall layout of the system in the passenger cabin 2, the production and installation effort and expense can be minimized. Also, with a relatively small number of various different standard components for assembling the overall cable laying path, an efficient system is provided for achieving essentially any required cable layout configuration according to the individual requirements of a particular application.

As can be seen in FIG. 9, the lower part 12 of the longitudinal guide element 10 extends over the edge of the floor panel forming the cabin floor 13, and thus forms a closed transition from the floor panel to the side trim base angle 23A. After laying the cables 7 therein, the open cable channels 123 are covered and closed by the upper part 11, by simply snapping the upper part 11 onto the lower part 12 that has been secured onto the floor. The flexible edge rim 113 of the lateral cover strip 112 covers the edge 15 of the floor covering or carpet 14 and holds it against the aircraft floor 13. Thus, the longitudinal guide elements 10 arranged along the edge of the cabin floor adjoining the cabin wall of the passenger cabin 2 not only provide a cable guiding and protecting function, but also advantageously form a clean finished trim of the floor covering and bridge over the area of the junction between the floor 13 and the cabin wall 23 or particularly the base angle 23A.

Figure 11B:
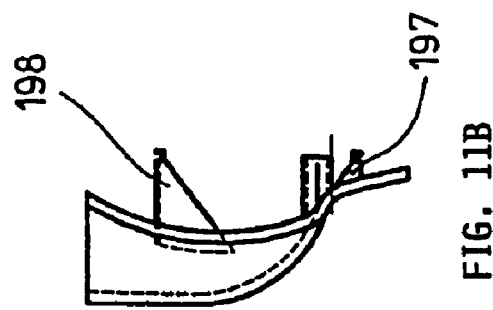
FIGS. 11A, 11B and 11C are top, side and end views of an upper section of the cable branch junction.
Figure 11A:
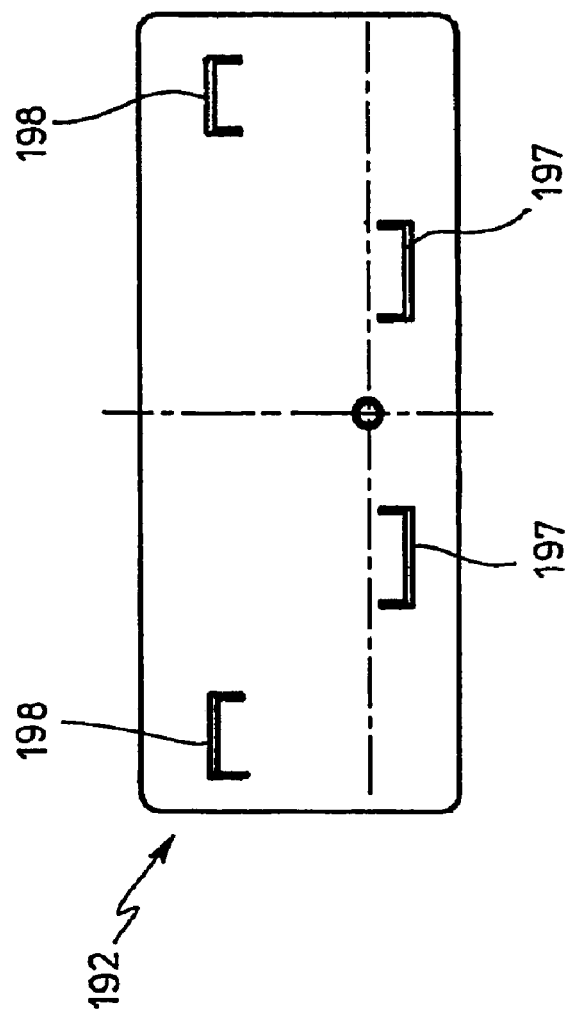
Figure 11C:
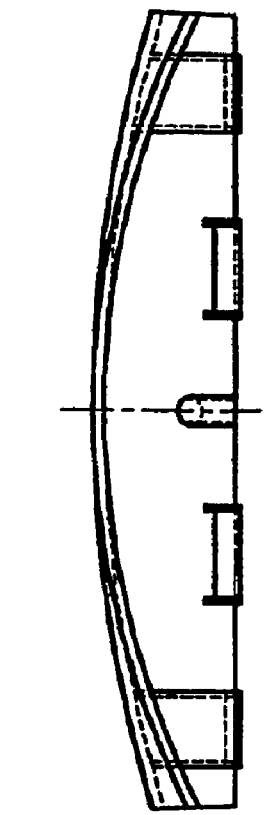

FIGS. 10 and 11, including the particular views of FIGS. 10A, 10B, 10C, 11A, 11B, and 11C, show the two essential components, namely the lower section 191 and the upper section 192, that form a respective cable branch junction 19. As shown in FIGS. 10A, 10B and 10C, the lower section 191 is secured (e.g. by screws, studs, brads, rivets, adhesive, snap fasteners, etc.) to the cabin floor and serves to receive the cables and/or conductor lines in a cable passage including a transverse or crosswise extending cable receiving area 193 and lengthwise or longitudinal extending cable receiving areas 194. Particularly, the cables or lines 7 can be guided continuously in the longitudinal direction through both opposite longitudinal receiving areas 194, or can be deflected or redirected into a transverse direction through the transverse receiving area 193, from which the cables or lines 7 are guided into an attached transverse guide element 20. For this purpose, friction-fit or form-locking connector stubs 195 or the like are provided protruding from the side of the transverse receiving area 193, to allow the next guide element, i.e. the adjoining transverse guide element 20, to be "plugged" easily onto the cable branch junction 19 to allow a simple joining thereof.

To achieve a strong and stable structure of the overall cable branch junction 19, the lower section 191 is provided with stiffening ribs 196 which form stiffening areas providing a stiff curved transition from the longitudinal receiving areas 194 to the transverse receiving area 193. The cables 7 can be laid or curved around this stiffened curved area to be deflected from the longitudinal to the transverse direction.

The upper section 192 of the cable branch junction 19 as shown in FIGS. 11A, 11B and 11C is provided to cover and close at least a portion of the cable passage of the lower section 191. Particularly, the upper section 192 covers at least the longitudinal receiving areas 194 of the lower section 191. For this purpose, inner catch elements 197 and outer catch elements 198 can engage corresponding or mating mounting elements or studs 199 provided on the lower section 191, in order to provide a stable and secure covered protection for the installed cables, e.g. to protect the cables against being stepped on by passengers. The transverse receiving area 193 is preferably at least partially covered by the transverse guide element 20 connected thereto, and in the final installed condition (for example as shown in FIGS. 13 and 14), both of these components are arranged underneath the floor covering 14 such as a carpet, so that an additional covering of this area of the cable branch junction 19 is not required.

Figure 12:
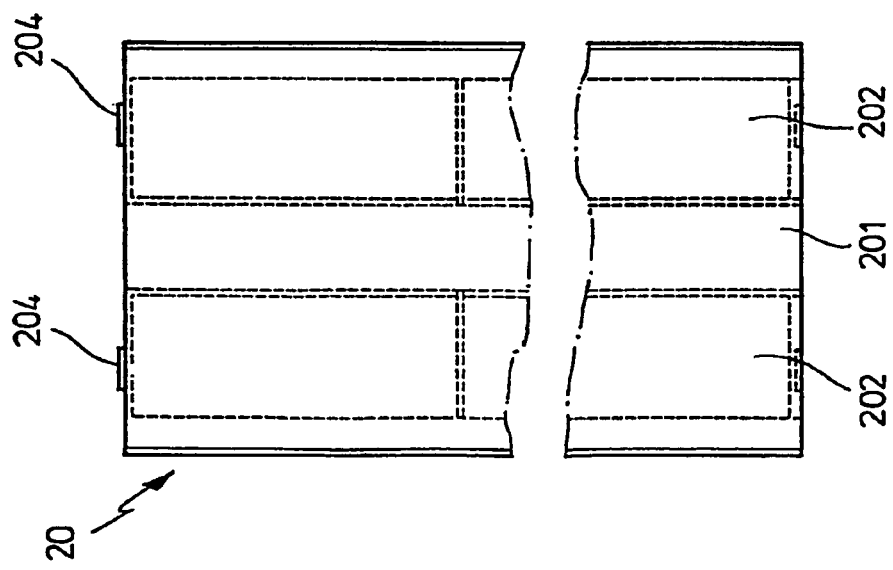
FIG. 12 is an individual detail top plan view of the transverse or crosswise extending cable guide element.

FIG. 12 shows a top plan view of a transverse guide element 20 individually by itself. A cross-section thereof is shown in FIG. 13. A central area of the transverse guide element 20 forms a cable channel 201 that is bounded by a floor plate 205 and vertical webs, and that is preferably covered by a cover strip 203. Transition slopes or ramps 202 extend laterally from the central cable channel 201, whereby a smooth tapering transition is achieved in the area of the floor of the cabin, so as to reduce a tripping hazard for the passengers. The central cable channel 201 and the transition ramps 202 are joined and unified by the common floor plate 205, whereby the transition ramps 202 together with the vertical side webs of the cable channel 201 and the floor plate 205 form a closed triangular sectional profile, which makes the overall transverse guide element 20 strong and stable so as to withstand being stepped on by the passengers.

Figure 13:
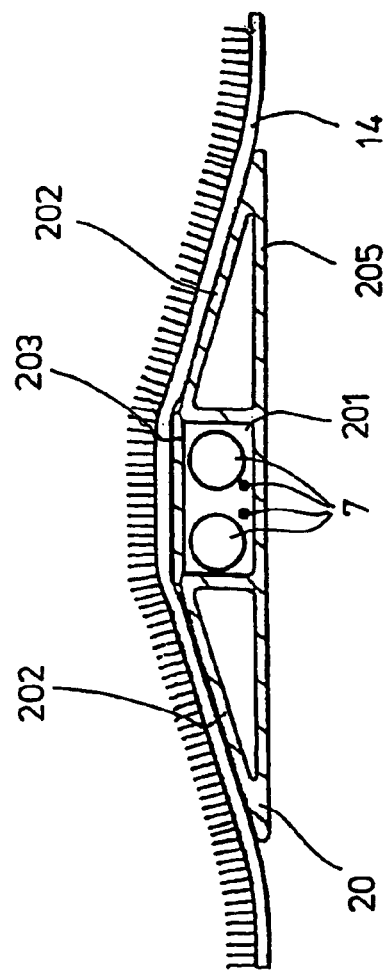
FIG. 13 is a sectional view of the transverse or crosswise extending cable guide element of FIG. 12 in its installed condition.

FIG. 13 further shows that the transverse guide element 20 is preferably arranged below the floor covering 14 such as a carpet. The connection of the transverse guide element 20 to the cable branch junction 19 is achieved by means of friction-fit or form-locking connectors 195 (provided on the junctions 19) and 204 (provided on the guide elements 20), which are embodied to snap-fit together. Similarly, an interconnection of plural transverse guide elements 20 can also be achieved by inter-engaging the respective connectors 204 thereof.

FIG. 14 shows an exemplary top plan view of the cable laying arrangement 1 in the area of two cable branch junctions 19 and 19' along a seat rail 5. This example shows the layout of the cables or lines 7, 7' beginning from a transverse feed-in run on one side of the seat rail 5, around a seat leg or foot 6 and then separately in a transverse direction and in a longitudinal direction on the other side of the seat rail 5.

For this purpose, the lines 7 and 7' are received by the transverse receiving area 193 of the first cable branch junction 19, are deflected into the longitudinal direction through the longitudinal receiving area 194, where they temporarily leave or protrude from the first junction 19. There, the cables 7 and 7' are looped to form a 180° direction reversal around the seat leg 6 under the seat rail cover 9. Then, the cables 7 and 7' extend further on the other side of the seat rail 5, where they enter the longitudinal receiving area 194' of the second cable branch junction 19'. At this point, the two cables 7 and 7' are separated and respectively guided differently. Namely, the cable or line 7' is deflected into the crosswise direction through the crosswise or transverse receiving area 193' and from there into a connected transverse guide element 20. On the other hand, the cable or line 7 is guided continuously in the longitudinal direction through the longitudinal receiving area 194' of the cable branch junction 19', from which it is directed into another connected longitudinal guide element 10, which in turn guides the cable 7 further in the longitudinal direction parallel along the seat rail 5 to the next seat row. The lower parts 12 of the longitudinal guide elements 10 are covered by the upper parts 11 as described above. Similarly, the tops of the cable branch junctions 19 and 19' are covered by upper sections 192 and 192', also as described above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a passenger transport aircraft having a passenger cabin therein bounded from below by a cabin floor, a cable channel arrangement arranged adjacent to said cabin floor in said passenger cabin, and power and/or data conductor cables received in said cable channel arrangement,
   an improvement wherein said cable channel arrangement comprises:
   a longitudinal guide element extending longitudinally in said cabin and forming a longitudinal cable channel with at least a respective one of said cables received therein;
   a transverse guide element extending transversely in said cabin and forming a transverse cable channel with at least a respective one of said cables received therein; and
   a cable branch junction that is joined to and interconnects said longitudinal guide element and said transverse guide element, and that forms a cable passage therein including a longitudinal cable receiving area communicating into said longitudinal cable channel and a transverse cable receiving area communicating into said transverse cable channel, with said at least one respective cable passing through said passage;
   wherein each respective one of said guide elements respectively comprises a lower part secured to said cabin floor and an upper part arranged on said lower part to cover said cable channel of said respective guide element.

2. The improvement in the passenger transport aircraft according to claim 1, wherein said longitudinal guide element and said transverse guide element extend perpendicular to each other, and said cable branch junction forms an intersection therebetween.

3. The improvement in the passenger transport aircraft according to claim 1, wherein said lower part of each said guide element is arranged on top of said cabin floor and is secured thereto.

4. The improvement in the passenger transport aircraft according to claim 1, wherein said upper part and said lower part of each said guide element are separate individual components relative to each other, and said upper part is removably secured onto said lower part.

5. The improvement in the passenger transport aircraft according to claim 1, wherein said upper part and said lower part of each said guide element respectively comprise mating snap-fit fasteners that snap-engage each other so as to removably secure said upper part onto said lower part.

6. The improvement in the passenger transport aircraft according to claim 1, wherein:
   said lower part of said longitudinal guide element comprises a base, a central web extending upwardly from said base, and two side webs respectively extending from said base parallel to each other on opposite sides of and spaced apart from said central web, forming respective ones of said longitudinal cable channel between said side webs and said central web respectively on each side of said central web; and
   said upper part of said longitudinal guide element comprises a downwardly facing catch element that matingly corresponds with said central web of said lower part, and two lateral cover strips that protrude laterally on opposite sides of said catch element so as to cover said longitudinal cover channels and that include elastically flexible free edge rims protruding laterally beyond said side webs of said lower part.

7. The improvement in the passenger transport aircraft according to claim 6, wherein the aircraft further has a seat mounting rail set into or arranged on said cabin floor and a floor covering arranged on said cabin floor, wherein said longitudinal guide element extends along and adjacent to said seat mounting rail with a first one of said cover strips oriented toward said seat mounting rail and a second one of said cover strips oriented toward said floor covering with an edge of said floor covering received between said cabin floor and said free edge rim of said second one of said cover strips.

8. The improvement in the passenger transport aircraft according to claim 1, wherein the aircraft includes side wall trim paneling and a side trim base angle that forms a transition and joint between said cabin floor and said side wall trim paneling, and wherein said longitudinal guide element extends along said side trim base angle and bridges and covers a joint gap between said cabin floor and said side trim base angle.

9. The improvement in the passenger transport aircraft according to claim 1, wherein the aircraft further includes a seat mounting rail set into or arranged on said cabin floor, and further comprising a seat rail cover that comprises a central member with catch elements that engage into said seat mounting rail to hold said seat rail cover thereon, and two lateral cover strips that protrude laterally in opposite directions from said central member and that respectively have elastically flexible free edge rims protruding away from said seat mounting rail and toward said cabin floor.

10. The improvement in the passenger transport aircraft according to claim 9, wherein each said free edge rim of said seat rail cover and an upper surface of said upper part of said longitudinal guide element are respectively configured to join and flushly complement each other.

11. The improvement in the passenger transport aircraft according to claim 9, wherein said longitudinal guide element extends along and next to said seat mounting rail, and one of said lateral cover strips of said seat rail cover extends over and at least partially covers said longitudinal guide element with said free edge rim of said one of said lateral cover strips partially overlapping said upper part of said longitudinal guide element and seated flushly into a recessed step provided in an upper surface of said upper part.

12. The improvement in the passenger transport aircraft according to claim 9, wherein the aircraft further includes at least one of a cable guide channel extending along next to said seat mounting rail and a floor covering provided on said cabin floor with a floor covering edge of said floor covering extending along said seat mounting rail, and wherein one of said lateral cover strips of said seat rail cover extends over and at least partially covers at least one of said cable guide channel and said floor covering edge with said free edge rim of said one of said lateral cover strips extending over and pressing against said floor covering edge.

13. The improvement in the passenger transport aircraft according to claim 9, wherein at least said elastically flexible free edge rims of said seat rail cover and said upper part of said longitudinal guide element are each made of a respective plastic.

14. The improvement in the passenger transport aircraft according to claim 1, further comprising an end cap that is engaged into an open end of said longitudinal cable channel at an end of said longitudinal guide element so as to close said open end and cover said end.

15. The improvement in the passenger transport aircraft according to claim 1, wherein said lower part of said transverse guide element comprises a base plate interconnecting two tapering ramp members with said transverse cable channel therebetween, and said upper part of said transverse guide element comprises a cover plate that covers said transverse cable channel between said two tapering ramp members.

16. The improvement in the passenger transport aircraft according to claim 1, further comprising friction-fit or form-locking connectors provided at an end of said transverse guide element.

17. The improvement in the passenger transport aircraft according to claim 16, wherein said cable branch junction comprises a lower section forming said cable passage receiving said cable therein, and an upper section that covers at least a portion of said lower section, and wherein connector elements are provided on said transverse cable receiving area of said lower section and are engagingly connected with said connectors provided on said transverse guide element.

18. The improvement in the passenger transport aircraft according to claim 17, wherein said aircraft further includes a floor covering arranged on said cabin floor, and wherein said transverse guide element and said transverse cable receiving area of said lower section of said cable branch junction are arranged under and covered by said floor covering.

19. The improvement in the passenger transport aircraft according to claim 17, wherein said lower section includes a stiffened area and mounting elements in said longitudinal cable receiving area, said upper section covers only said longitudinal cable receiving area and not said transverse cable receiving area, and said upper section includes catch elements that engage said stiffened area and said mounting elements.

* * * * *